United States Patent Office 3,591,605
Patented July 6, 1971

3,591,605
THIOPHENE DERIVATIVES
Toshio Mizutani, Hirakata-shi, Nobushige Itaya and Shigeyoshi Kitamura, Minoo-shi, Nobuyuki Kameda, Takarazuka-shi, Yositosi Okuno, Toyonaka-shi, and Keimei Fujimoto, Kyoto, Japan, assignors to Sumitomo Chemical Company, Ltd., Osaka, Japan
No Drawing. Filed May 5, 1969, Ser. No. 821,943
Claims priority, application Japan, May 11, 1968, 43/31,763; June 1, 1968, 43/37,680
Int. Cl. C07d *63/18;* A01n *9/12*
U.S. Cl. 260—332.2R  8 Claims

ABSTRACT OF THE DISCLOSURE

Novel thiophene derivatives having the formula,

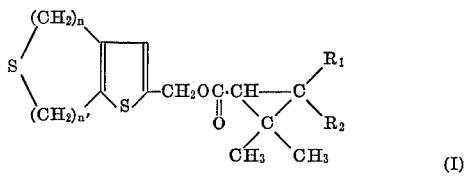

wherein $R_1$ means hydrogen atom or methyl group, $R_2$ means methyl, 2-methyl-1-propenyl or phenyl group when $R_1$ is hydrogen atom, and means methyl group when $R_1$ is methyl group, and $n$ and $n'$ mean an integer of 1 or 2 (when any one of them is an integer of 2, the other is an integer of 1), which have excellent insecticidal activities.

This invention relates to a novel thiophene derivative and a process for producing the same and an insecticidal composition containing the same.

As insecticides among those which are actually used at present, pyrethoid-type insecticides are most useful in that they are harmless to mammals and are quick acting. Conventional pyrethroids, however, are not always inexpensive and hence are restricted in uses, and the advent of inexpensive pyrethroids has been strongly desired.

With an aim to satisfy the above desire, the present inventors made various studies to discover novel insecticidal compounds having strong activities.

It is therefore an object of the present invention to provide novel insecticidal compounds which are harmless to mammals and are inexpensive.

Another object of the invention is to provide insecticidal compositions containing said novel insecticidal compounds as active ingredients.

Other objects will be apparent from the following description.

In accordance with the present invention, there are provided a novel thiophene derivative represented by the formula,

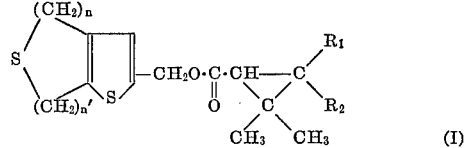

wherein $R_1$ means hydrogen atom or methyl group, $R_2$ means methyl, 2-methyl-1-prophnyl or phenyl group when $R_1$ is hydrogen atom, and means methyl group when $R_1$ is methyl group, and $n$ and $n'$ mean an integer of 1 or 2 (when any one of them is an integer of 2, the other is an integer of 1), and also provide an insecticidal composition containing the same.

The thiophene derivative of the Formula I is prepared by reacting a cyclopropanecarboxylic acid represented by the formula

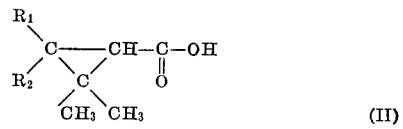

wherein $R_1$ and $R_2$ have the same meanings as defined above, or a reactive derivative thereof, with a thenylalcohol represented by the formula,

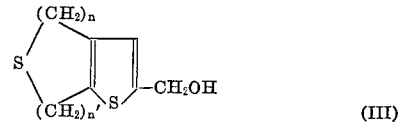

wherein $n$ and $n'$ have the same meanings as defined above; or reacting a cyclopropanecarboxylic acid of the Formula II with a thenylhalogenide represented by the formula,

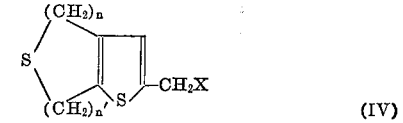

wherein $n$ and $n'$ have the same meanings as defined above and X means a halogen atom, in the presence of a basic condensing agent.

The process for preparing the novel thiophene derivative of the Formula I in accordance with the present invention will be described in further detail hereunder.

That is, the present process may be divided into four cases illustrated below.

(1) The first process is carried out in such a manner that the thenylalcohol of the Formula III is reacted with a halide of the cyclopropanecarboxylic acid of the Formula II in the presence of a de-hydrogen halide agent.

The thenylalcohol of the Formula III is a novel compound easily prepared by reducing a corresponding aldehyde or a corresponding carboxylic acid or an ester thereof according to the conventional method, or hydrolyzing a halide or an ester of the thenylalcohol.

In carrying out this process, the reaction is preferably controlled at room temperature or below, and use of an inert solvent is not always necessary but use thereof is preferable in order to proceed the reaction easily.

As the de-hydrogen halide agent, an organic tertiary base is preferably employed and an alkali metal or an alkali earth metal carbonate may be also employed.

(2) The second process is carried out in such a manner that the thenylhalogenide of the Formula IV is reacted with the cyclopropanecarboxylic acid of the Formula II in the presence of a basic condensing agent.

In carrying out this process, use of an inert solvent is not always necessary but the inert solvent such as acetone and methyl isobutyl ketone is preferably employed in order to proceed the reaction easily.

As the basic condensing agent, there are an organic tertiary base such as triethylamine, pyridine and diethylaniline and an alkali metal and an alkali earth metal hydroxide and carbonate.

In case of using the organic tertiary base, it is practically preferably to mixing simultaneously the halogenide of the Formula IV and the carboxylic acid of the Formula II with said organic tertiary base, while said base may be previously reacted with the halogenide of the Formula IV or the carboxylic acid of the Formula II and thereafter the resulting salt may be subjected to the reaction.

In cas of using the hydroxide or carbonate, it is practically preferable that the hydroxide or carbonate is previously reacted with the carboxylic acid of the Formula II to form the salt, which is thereafter subjected to the reaction with the halogenide of the Formula IV, while it may be also applied to mixing simultaneously the halogenide of the Formula IV and the carboxylic acid (II) with said hydroxide or carbonate.

(3) The third process is carried out in such a manner that the thenylalcohol of the Formula III is reacted with an anhydride of the cyclopropanecarboxylic acid of the Formula II.

In carrying out this process, the reaction is controlled in an inert solvent such as toluene and xylene at room temperature, preferably at elevated temperature under reflux to complete in a short reaction period of time.

(4) The fourth process is carried out in such a manner that the thenylalcohol of the Formula III is reacted with the carboxylic acid of the Formula II in the presence of a dehydrating agent such as cyclohexylcarbodiimide at room temperature, preferably in an inert solvent such as methylene chloride, benzene and toluene.

The thenylalcohol of the Formula III employed in the present invention includes:

2-hydroxymethyl-6-thia-4,5,6,7,-tetrahydrobenzo
   thiophene
2-hydroxymethyl-5-thia4,5,6,7-tetrahydrobenzo-
   thiophene
2-hydroxymethyl-4,6-dihydrothieno[3,4-b]thiophene The cyclopropanecarboxylic acid of the Formula II and their reactive derivatives comprises various stereoisomers and optical isomers. It is needless to say that the carboxylic acid and the derivative thereof involve their isomers.

All the thiophene derivatives of Formula I, which are provided in accordance with the present invention, are novel compounds and have prominent insecticidal activities on such injurious insects as houseflies, mosquitoes and cockroaches. Moreover, the compounds are usable without taking into consideration any injury towards mammals, and have wide use particularly for prevention of epidemics. Further, they are extremely useful also for the control of insects injurious to stored cereals, agriculture and forestry, and are applicable on crops before harvest time and packing materials for foodstuffs as well as in a greenhouse and in a domestic horticulture.

Particularly useful compounds for the purpose of the present invention are as shown below, but compounds usable in the present invention are, of course, not limited only to these.

(1)
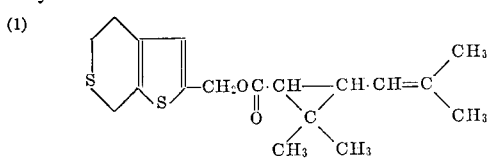
2-chrysanthemoxymethyl-6-thia-4,5,6,7-tetrahydrobenzothiophene (2)
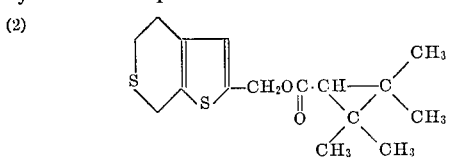
2-(2′,2′,3′,3′-tetramethylcyclopropane-1′-carboxymethyl)-6-thia-4,5,6,7-tetrahydrobenzothiophene (3)
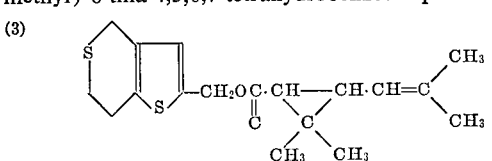
2-chrysanthemoxymethyl-5-thia-4,5,6,7-tetrahydrobenzothiophene (4)
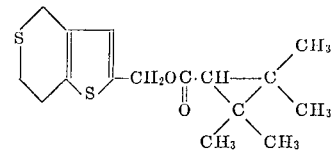
2-(2′,2′,3′,3′-tetramethylcyclopropane-1′-carboxymethyl)-5-thia-4,5,6,7-tetrahydrobenzothiophene (5)
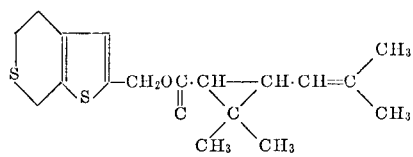
2-chrysanthemoxymethyl-4,6-dihydrothieno[3,4-b]-thiophene (6)
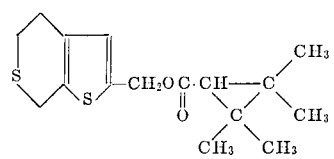
2-(2′,2′,3′,3′-trimethylcyclopropane-1′-carboxymethyl)-4,6-dihydrothieno[3,4-b]thiophene In preparing insecticidal compositions containing as active ingredients the novel compounds provided in accordance with the present invention, it is sometimes preferable, depending on the objects of application of the insecticidal composition, that the compounds are used after dissolving in an organic solvent such as xylene and methylnaphthalene. However, they can be processed, using diluents for common insecticides, into any forms of oil preparations, emulsifiable concentrates, wettable powders, dusts, aerosols, mosquito coils, fumigants, granule, baits or dusts or solid preparations that act as both attractant and toxicant, as occasion demands, according to ordinary procedures as adopted in the case of pyrethrum extracts and allethrin. Further, the compounds may be enhanced in activities by using in admixture with such synergistic agents as α-[2-(2-butoxyethoxy)ethoxy]-4,5-methylenedioxy-2-propyltoluene (hereinafter referred to Butoxide), 1,2 methylenedioxy-4-[2-(octylsulfinyl)propyl] - benzene (hereinafter referred to Sulfoxide) and N-(2-ethylhexyl)bicyclo[2,2,1]hepta-5-en-anhydrophthalic acid-2,3-dicarboximide (hereinafter referred to MGK–264).

When the present compounds are employed as a mosquito coil, the may be enhanced in activities by adding 3,4-methylenedioxybenzoic acid, 2,6-di-ter·butyl-4-methylphenol, benzene-p-dicarboxylic acid, benzene-m-dicarboxylic acid, p-ter·butylbenzoic acid, p-ter·butylbenzoic acid pyperonylester, 1-methyl-2-carboxy-4-isopropyl cyclohexanone-(3), 3-methoxy-4-hydroxybenzoic acid, 2-isopropyl-4-acetylvaleric acid and the like.

In addition, it is also possible to prepare compounded multipurpose compositions by mixing the present compounds with other physiologically active ingredients, such as organo-phosphorus-type insecticides, e.g. O,O-dimethyl-O-(3-methyl - 4 - nitrophenyl)thiophasphate (hereinafter referred to Sumithion: registered trademark of Sumitomo Chemical Co., Ltd. in Japan) and O,O-dimethyl-2,2-dichlorovinylphosphate (hereinafter referred to DDVP), organochlorine-type insecticides, carbamate-type insecticides, and other-type insecticides, fungicides, nematocides, herbicides, fertilizers and other agricultural chemicals.

The present invention will be illustrated with reference to examples, which are, of course, not to limit the scope of the invention. Parts and percentages are by weight.

EXAMPLE 1

3.7 g. of 2-hydroxymethyl-6-thia-4,5,6,7-tetrahydrobenzothiophene was dissolved in a mixture of 2.4 g. of dry pyridine and 20 ml. of dry benzene.

A solution of 3.7 g. of dl-cis-trans-chrysanthemoyl chloride in 15 ml. of dry benzene was added to the mixture while being stirred.

The reaction vessel was tightly closed and allowed to stand overnight at room temperature.

The reaction mixture was washed with 5% hydrochloric acid, 5% aqueous solution of sodium carbonate and saturated sodium chloride solution and dried over anhydrous sodium sulfate. Removing the solvents employed gave pale yellow oil, which was purified by passing through an alumina column.

Thus 5.9 g. of 2-dl-cis-trans-chrysanthemoxymethyl-6-thia-4,5,6,7 - tetrahydrobenzothiophene was obtained, $n_D^{23}$: 1.5624.

Elementary analysis.—Calculated (as $C_{18}H_{24}O_2S_2$) (percent): C, 64.2; H, 7.2; S, 19.1. Found (percent): C, 64.1; H, 7.5; S, 18.9.

EXAMPLE 2

A mixture of 3.7 g. of 2-hydroxymethyl-6-thia-4,5,6,7-tetrahydrobenzothiophene and 5.4 g. of 2,2,3,3-tetramethyl-cyclopropanecarboxylic acid anhydride was dissolved in 50 ml. of toluene and the mixture was heated for 4 hours under reflux.

The reaction mixture was cooled and thereafter washed with 5% aqueous solution of sodium carbonate and saturated sodium chloride solution and dried over anhydrous magnesium sulfate.

After evaporation of toluene, purification with an alumina column gave 5.7 g. of 2-(2′,2′,3′,3′-tetramethyl-cyclopropane-1′-carboxymethyl)-6-thia - 4,5,6,7 - tetrahydrobenzothiophene, colorless sticky oil, $n_D^{23}$: 1.5640.

Elementary analysis.—Calculated (as $C_{16}H_{22}O_2S_2$) (percent): C, 61.9; H, 7.1; S, 20.7. Found (percent): C, 62.0; H, 7.4; S, 20.6.

EXAMPLE 3

A mixture of 2.8 g. of 2-chloromethyl-5-thia-4,5,6,7-tetrahydrobenzothiophene and 2.6 g. of dl-trans-chrysanthemic acid was dissolved in 30 ml. of methyl isobutyl ketone and 3.0 g. of triethylamine was added thereto.

The mixture was heated for 10 hours under reflux.

After cooling, the reaction mixture was washed with 5% aqueous solution of sodium carbonate and saturated sodium chloride solution and dried over anhydrous magnesium sulfate.

After evaporation of the solvent, the rest mixed with benzene was purified by passing through an alumina column, thereby to obtain 4.1 g. of 2-dl-trans-chrysanthemoxymethyl - 5 - thia - 4,5,6,7 - tetrahydrobenzothiophene, $N_D^{23}$: 1.5630.

Elementary analysis.—Calculated (as $C_{18}H_{24}O_2S_2$) (percent): C, 64.2; H, 7.2; S, 19.1. Found (percent): C, 64.0; H, 7.6; S, 19.0.

EXAMPLE 4

A mixture of 2.8 g. of 2-hydroxymethyl-5-thia-4,5,6,7-tetrahydrobenzothiophene and 2.2 g. of 2,2,3,3-tetramethylcyclopropane-1-carboxylic acid was dissolved in 50 ml. of methylene dichloride and 4.5 g. of dicyclohexylcarbodiimide was added to the solution. The reaction mixture was allowed to stand overnight at room temperature.

After separation of dicyclohexylurea precipitated, the reaction mixture was washed with 5% aqueous solution of sodium carbonate and saturated sodium chloride solution, dried over anhydrous magnesium sulfate, and thereafter subjected to distillation under decreased pressure.

The rest mixed with benzene was purified by passing through an alumina column, thereby to obtain 4.3 g. of 2 - (2′,2′,3′,3′ - tetramethylcyclopropane - 1′ - carboxymethyl)-5-thia-4,5,6,7 - tetrahydrobenzothiophene, $N_D^{23}$: 1.5645.

Elementary analysis.—Calculated (as $C_{16}H_{22}O_2S_2$) (percent): C, 61.9; H, 7.1; S, 20.7. Found (percent): C, 61.8; H, 7.4; S, 20.4.

EXAMPLE 5

3.4 g. of 2-hydroxymethyl-4,6-dihydrothieno (3,4-b) thiophene and 3.7 g. of dl-trans-chrysanthemoyl chloride were treated according to the same manner as in Example 1, thereby to obtain 5.4 g. of 2-dl-trans-chrysanthemoxymethyl-4,6-dihydrothieno (3,4-b)thiophene, $N_D^{23}$: 1.5654.

Elementary analysis.—Calculated (as $C_{17}H_{22}O_2S_2$) (percent): C, 63.3; H, 6.9; S, 19.9. Found (percent): C, 63.2; H, 7.3; S, 19.6.

EXAMPLE 6

2.6 g. of 2-hydroxymethyl-4,6-dihydrothieno (3,4-b) thiophene and 3.0 g. of dl-cis-trans-2,2,3-trimethylcyclopropane-1-carboxylic acid chloride were treated according to the same manner as in Example 1, thereby to obtain 4.5 g. of 2-(dl-cis-trans-2′,2′,3′-trimethylcyclopropane-1′-carboxymethyl)-4,6-dihydrothieno (3,4-b) thiophene, $N_D^{23}$: 1.5578.

Elementary analysis. — Calculated (as $C_{16}H_{20}O_2S_2$) (percent): C, 59.5; H, 6.4; S, 22.7. Found (percent): C, 59.7; H, 6.7; S, 22.3.

EXAMPLE 7

Each 0.1 part of the compounds obtained in Examples 1, 5 and 6 was respectively dissolved in refined kerosene to make the volume 100 parts, thereby to obtain 0.1% oil preparations.

EXAMPLE 8

A mixture of 0.05 part of the compound obtained in Example 2 and 0.25 part of Butoxide was dissolved in refined kerosene to make the volume 100 parts, thereby to obtain 0.05% oil preparation.

EXAMPLE 9

A mixture of 0.05 part of the compound obtained in Example 3 and 0.25 part of Sulfoxide was dissolved in refined kerosene to make the volume 100 parts, thereby to obtain 0.05% oil preparation.

EXAMPLE 10

A mixture of 0.1 part of the compound obtained in Example 4, and 0.4 part of MGK–264 was dissolved in refined kerosene to make the volume 100 parts, thereby to obtain 0.1% oil preparation.

EXAMPLE 11

Each mixture of 20 parts of the compounds obtained in Examples 1, 2, 3 and 5 and 10 parts of Sorpol SM–200 (trade name of the emulsifier produced by Toho Chemical Co., Ltd. in Japan) were respectively dissolved in 70 parts of xylene while being stirred thereby to obtain 20% emulsifiable concentrates.

EXAMPLE 12

Each mixture of 17 parts of the compounds obtained in Examples 4 and 6, 3 parts of DDVP and 10 parts of Sorpol SM–200 (the same as mentioned above) was respectively dissolved in 70 parts of xylene, thereby to obtain emulsifiable concentrates.

EXAMPLE 13

Each 1.5 parts of the compounds obtained in Examples 1, 3 and 5 was respectively dissolved in 20 ml. of methyl alcohol and the solutions were respectively mixed with a carrier for the mosquito coil (a mixture of tabu powder, marc and wood powder in the ratio of 3:5:1) while being stirred. Methyl alcohol employed was evaporated and thereafter 150 ml. of water was added thereto.

The mixtures were successively kneaded, molded and dried, thereby to obtain 1.5% mosquito coils.

EXAMPLE 14

Each 2 parts of the compounds obtained in Examples 1, 2 and 5 was respectively dissolved in 20 parts of acetone and 98 parts of 300 mesh diatomaceous earth was added thereto.

The mixture was sufficiently stirred in a mixing and grinding machine and thereafter acetone was evaporated to obtain each 2% dust.

EXAMPLE 15

A mixture of 5 parts of the compound obtained in Example, 3, 5 parts of Toyolignine CT (trademark of Toyobo Co., in Japan) and 90 parts of GSM clay (trademark of Zieklite Kogyo K. K. in Japan) was sufficiently mixed in a mixing and grinding machine.

10 parts of water was added thereto and the mixture was granulated with granulator to obtain granules which were dried with a ventilation.

EXAMPLE 16

A mixture of 0.3 part of the compound obtained in Example 1 and 0.2 part of N-(3,4,5,6-tetrahydrophthalimide)-methylchrysanthemate (hereinafter referred to as Phthalthrine) was dissolved in a mixture of 7 parts of xylene and 7.5 parts of refined kerosene.

The mixture was introduced into an aerosol vessel equipped with a valve and thereafter 85 parts of propellent (liquefied petroleum gas) was introduced through the valve under pressure thereby to obtain aerosol.

EXAMPLE 17

A mixture of 0.3 part of the compound obtained in Example 2, 0.3 part of Sumithion (trademark of Sumitomo Chemical Co., Ltd. in Japan), 7 parts of xylene and 7.4 parts of refined kerosene was treated according to the same manner as in Example 16, thereby to obtain aerosol.

EXAMPLE 18

A mixture of 0.3 part of the compound obtained in Example 5, 0.2 part of Phthalthrine, 1 part of Atmos 300 (trademark of an emulsifier produced by Atlas Chemical Co.) and 50 parts of pure water was emulsified and thereafter the mixture was introduced into an aerosol vessel together with 35 parts of a mixture of deodorized butane and deodorized propane in the mixture ratio of 3:1, thereby to obtain water based aerosol.

EXAMPLE 19

Each 0.8 part of the compounds obtained in Examples 2, 4 and 6 was respectively dissolved in 20 ml. of methanol and each solution was treated according to the same manner as in Example 13, thereby to obtain 0.8% mosquito coils.

EXAMPLE 20

25 parts of the compound obtained in Example 1 was mixed with 5 parts of Sorpol 200 (the same as mentioned above) and 70 parts of 300 mesh talc was added thereto.

The mixture was sufficiently mixed in a mixing and grinding machine thereby to obtain a wettable powder.

An insecticidal effectiveness of the present compound is shown in the following experiments executed by using the compositions obtained in Examples 7 to 20.

EXPERIMENT 1

Each 5 ml. of oil preparations obtained in Examples 7, 8, 9 and 10 was sprayed according to the Campbell's turn table method [Soap and Sanitary Chemicals, vol. 14, No. 6, 119 (1938)]. After 20 seconds, the shutter was opened and houseflies (adult) (one group of about 100 flies) were exposed to sprayed mist for 10 minutes and thereafter the flies were transferred to the observation cage. After the flies were fed and allowed to stand for one day at room temperature, the mortality was examined.

The results are shown in the following Table 1.

TABLE 1

| Composition: | Mortality (percent) |
|---|---|
| Oil preparation of Example 6 (containing 0.1% of the compound of Example 1) | 93 |
| Oil preparation of Example 6 (containing 0.1% of the compound of Example 5) | 88 |
| Oil preparation of Example 6 (containing 0.1% of the compound of Example 6) | 80 |
| Oil preparation of Example 7 (containing 0.05% of the compound of Example 2 and 0.25% of butoxide) | 97 |
| Oil preparation of Example 8 (containing 0.05% of the compound of Example 3 and 0.25% of sulfoxide) | 90 |
| Oil preparation of Example 9 (containing 0.1% of the compound of Example 4 and 0.4% of MGK–264) | 93 |
| Oil preparation containing 0.2% of allethrine | 84 |

EXPERIMENT 2

By using aerosols obtained in Examples 16, 17 and 18, mortality to houseflies (adult) was examined according to the aerosol testing method using the Peet Grady Chamber [Soap and Chemical Specialties Blue Book (1965)]. The results are shown in the following Table 2.

TABLE 2

| Composition | Spraying amount [1] | Knock-down ratio percent | | | Mortality percent |
|---|---|---|---|---|---|
| | | 5 min. | 10 min. | 15 min. | |
| Aerosol of Ex. 16 | 2.87 | 4 | 37 | 88 | 55 |
| Aerosol of Ex. 17 | 3.20 | 12 | 43 | 84 | 75 |
| Aerosol of Ex. 18 | 3.09 | 7 | 48 | 85 | 60 |

[1] G./1000 ft.$^3$

EXPERIMENT 3

Each emulsifiable concentration obtained in Examples 11 and 17 was diluted to 50,000 times with water and 1.5 liters of the dilutes were respectively introduced into the styril cases having the width of 23 x 30 cm. and depth of 6 cm.

100 fullgrown larvae of northern house mosquitoes were liberated therein. It was found that more than 90% of larvae was killed within 24 hours.

EXPERIMENT 4

1 g. of the granule obtained in Example 15 was dropped in 10 liters of water placed in a 14 liter-volume polyethylene bucket.

After 1 day, 100 fullgrown larvae of northern house mosquitoes were liberated therein.

It was found that more than 90% of the larvae was killed within 24 hours.

EXPERIMENT 5

20 northern house mosquitoes (adult) were liberated in a 70 x 70 x 70 cm. glass chamber and 1 g. of the mosquito coils obtained in Examples 13 and 19 was respectively ignited to both ends thereof, thereafter the coils were respectively placed in said glass chamber.

It was found that more than 80% of the mosquitoes was knocked-down within 20 minutes.

EXPERIMENT 6

Butter was smeared on the side wall of a high glass Petri dish having 14 cm. of diameter and 7 cm. of height leaving about 1 cm. from the bottom nonsmeared. The dusts obtained in Example 14 were uniformly scattered on the bottom of said dish at a rate of 2 g./m.$^2$.

A group of 10 German cockroaches was respectively liberated therein and allowed to expose to the dust for 30 minutes.

After 3 days, it was found that more than 90% of the cockroaches was killed.

EXPERIMENT 7

Rice plants which had elapsed 45 days after sowing were respectively planted on the earth placed in 1/50,000 Wagner pots.

20% emulsifiable concentrate obtained in Example 11 containing the compound obtained in Example 5 and wettable powder obtained in Example 20 were respectively diluted to 500 times with water.

The dilutes were sprayed in the pots at a ratio of 10 ml./pot and the pots were covered by a wire net.

A group of about 30 green rice leafhoppers was respectively liberated therein.

It was found that more than 90% of the leafhoppers was killed after one day.

What we claim is:

1. A thiophene derivative represented by the formula

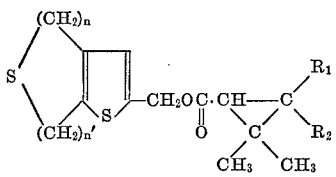

wherein $R_1$ means hydrogen atom or methyl group, $R_2$ means methyl, 2-methyl-1-propenyl or phenyl group when $R_1$ is hydrogen atom and means methyl group when $R_1$ is methyl group, and $n$ and $n'$ mean an integer of 1 or 2 (when any one of them is an integer of 2, the other is an integer of 1).

2. A thiophene derivative represented by the formula

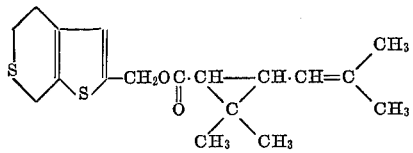

3. A thiophene derivative represented by the formula,

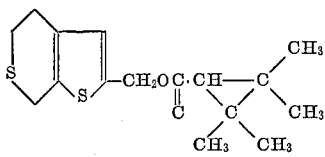

4. A thiophene derivative represented by the formula,

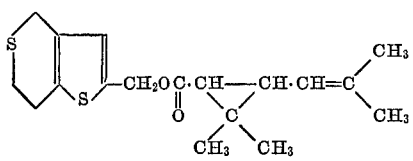

5. A thiophene derivative represented by the formula,

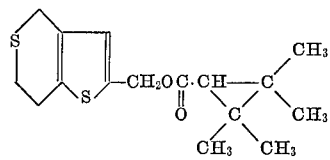

6. A thiophene derivative represented by the formula,

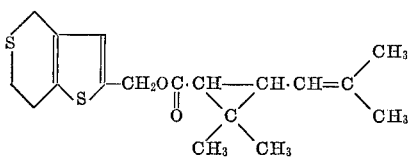

7. A thiophene derivative represented by the formula,

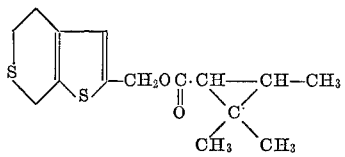

8. A compound of the formula,

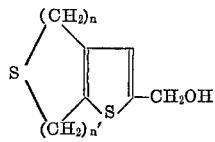

wherein $n$ and $n'$ mean an integer of 1 or 2 (when any one if them is an integer of 2, the other is an integer of 1).

References Cited

UNITED STATES PATENTS 3,426,037  2/1969  Biel et al. _____ 260—326.3
3,515,730  6/1970  Matsui et al. _____ 260—332.2

HENRY R. JILES, Primary Examiner

C. M. SHURKO, Assistant Examiner

U.S. Cl. X.R.

260—332.3P; 424—275